(12) United States Patent
Liang

(10) Patent No.: US 10,895,768 B2
(45) Date of Patent: Jan. 19, 2021

(54) DISPLAY DEVICE WITH LIMITING ELEMENTS AND LIMITING HOLES

(71) Applicants: HKC Corporation Limited, Shenzhen (CN); Chongqing HKC Optoelectronics Technology Co., ltd., Chongqing (CN)

(72) Inventor: Shuozhen Liang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 16/641,326

(22) PCT Filed: Sep. 20, 2017

(86) PCT No.: PCT/CN2017/102456
§ 371 (c)(1),
(2) Date: Feb. 24, 2020

(87) PCT Pub. No.: WO2019/037183
PCT Pub. Date: Feb. 28, 2019

(65) Prior Publication Data
US 2020/0386938 A1     Dec. 10, 2020

(30) Foreign Application Priority Data
Aug. 22, 2017  (CN) .......................... 2017 1 0725137

(51) Int. Cl.
*F21V 8/00*    (2006.01)
*G02F 1/1333*  (2006.01)

(52) U.S. Cl.
CPC ..... *G02F 1/133308* (2013.01); *G02B 6/0085* (2013.01); *G02B 6/0088* (2013.01);
(Continued)

(58) Field of Classification Search
CPC ............ G02B 6/0088; G02F 1/133317; G02F 1/13332; G02F 1/133322
(Continued)

(56) References Cited

U.S. PATENT DOCUMENTS

2013/0100371 A1*  4/2013  Yu ..................... G02F 1/133308
                                                      349/58
2013/0265519 A1* 10/2013  Yu ..................... G02F 1/133308
                                                      349/58
(Continued)

FOREIGN PATENT DOCUMENTS

| CN | 102354063 A |   | 2/2012 |
|----|-------------|---|--------|
| CN | 104297961 A | * | 1/2015 |
| CN | 104297980 A |   | 1/2015 |

OTHER PUBLICATIONS

China Patent Office "Search Report" dated Apr. 20, 2018.

*Primary Examiner* — Evan P Dzierzynski
*Assistant Examiner* — Keith G. Delahoussaye
(74) *Attorney, Agent, or Firm* — WPAT, PC

(57) ABSTRACT

A display device is provided. The display device includes a backlight module, a display panel, and a front frame. The backlight module includes a plastic frame. The display panel is attached on the plastic frame and is positioned at an emitting side of the backlight module. A limiting hole is defined in the display panel. The front frame engages with the display panel by a snap-fit connection and defines a first limiting element corresponding to the limiting hole. The first limiting element cooperates with the limiting hole to secure the display panel between the front frame and the plastic frame.

8 Claims, 4 Drawing Sheets

(52) U.S. Cl.
CPC ........... *G02F 2001/13332* (2013.01); *G02F 2001/133317* (2013.01); *G02F 2001/133322* (2013.01); *G02F 2202/28* (2013.01)

(58) Field of Classification Search
USPC ..................................... 349/58, 60
See application file for complete search history.

(56) References Cited

U.S. PATENT DOCUMENTS

| | | | |
|---|---|---|---|
| 2014/0063403 A1* | 3/2014 | Chen | G02F 1/133603 349/58 |
| 2016/0363722 A1* | 12/2016 | Choi | G02B 6/0091 |
| 2017/0118848 A1* | 4/2017 | Matsui | G02F 1/133308 |
| 2017/0142365 A1* | 5/2017 | Ozeki | H04N 5/44 |

\* cited by examiner

DISPLAY DEVICE WITH LIMITING ELEMENTS AND LIMITING HOLES

FIELD OF THE DISCLOSURE

The disclosure relates to a display technical field, and more particularly to a display device.

BACKGROUND

A display device generally includes a front frame, a display panel, and a backlight module. The front frame engages with the backlight module to snap the display panel between the backlight module and the front frame. However, with the continuous development of the display device, the display device tends to narrow the border. Thus, the portion of the display panel under the front frame is smaller, and the display panel is easy to fall off the front frame and backlight module. In other words, the stability of the display device is reduced, but the risk of damage to the display device is increased.

SUMMARY

The present application provides a display device for preventing the display panel from falling off between the front frame and the backlight module. The risk of damage to the display panel is reduced, and the stability of the display device is improved.

In one embodiment, the present disclosure provides a display device. The display device includes a backlight module, a display panel, and a front frame. The backlight module includes a plastic frame. The display panel is attached on the plastic frame and is positioned at an emitting side of the backlight module. At least one limiting hole is defined in the display panel. The front frame engages with the display panel by a snap-fit connection, and at least one first limiting element is defined at the front frame corresponding to the at least one limiting hole. The first limiting element is a positioning pillar, and the first limiting element penetrates through the limiting hole and resists the plastic frame so as to secure the display panel between the front frame and the plastic frame.

In one embodiment, the present disclosure provides a display device. The display device includes a backlight module, a display panel, and a front frame. The backlight module includes a plastic frame. The display panel is attached on the plastic frame and is positioned at an emitting side of the backlight module. A limiting hole is defined in the display panel. The front frame engages with the display panel by a snap-fit connection, and a first limiting element is defined at the front frame corresponding to the limiting hole. The first limiting element cooperates with the limiting hole to secure the display panel between the front frame and the plastic frame.

In one embodiment, the first limiting element is a positioning pillar, the positioning pillar passes through the limiting hole and resists the plastic frame so as to secure the display panel between the front frame and the plastic frame.

In one embodiment, the first limiting element includes a first screw and a first screw hole, the first screw passes through the first screw hole and the limiting hole and resists the plastic frame, so as to secure the display panel between the front frame and the plastic frame.

In one embodiment, the plastic frame defines a second limiting element corresponding to the limiting hole, the first limiting element, the second limiting element, and the limiting hole cooperate with each other so as to secure the display panel between the front frame and the plastic frame.

In one embodiment, the first limiting element is a positioning pillar, the second limiting element is a hollow positioning sleeve, the positioning pillar penetrates through the limiting hole and inserts into the hollow positioning sleeve.

In one embodiment, the first limiting element is a hollow positioning sleeve, the second limiting element is a positioning pillar, the second limiting element penetrates through the limiting hole and inserts into the first limiting element.

In one embodiment, the first limiting element includes a second screw and a second screw hole, the second limiting element is a screw hole, and the second screw penetrates through the second screw hole, the limiting hole, and the second limiting element.

In one embodiment, the inner diameter of the second limiting element is less than the outer diameter of first limiting element, thereby causing an interference fit between the first limiting element and the second limiting element.

In one embodiment, the backlight module further comprises a back plate, a light guide plate, a heat dissipating element, a light source assembly, and an optical film, the back plate comprises a bottom portion and a sidewall, the heat dissipating element and the light source assembly are attached on the sidewall, the light guide plate is attached on the bottom portion, the optical film is positioned at an emitting side of the light guide plate, the plastic frame is engaged with the back plate, thereby forming a receiving chamber to receive the light guide plate, the heat dissipating element, the light source assembly, and the optical film.

In one embodiment, a free end of the first limiting element is attached on the plastic frame by adhesive when the first limiting element resists the plastic frame.

In one embodiment, the present disclosure provides a display device. The display device includes a backlight module, a display panel, and a front frame. The backlight module includes a plastic frame. The display panel is attached on the plastic frame and is positioned at an emitting side of the backlight module. A limiting hole is defined in the display panel. The front frame is engaged with the display panel by a snap-fit connection, and a first limiting element is defined at the front frame corresponding to the limiting hole. The plastic frame defines a second limiting element corresponding to the limiting hole. The first limiting element, the second limiting element, and the limiting hole cooperate with each other so as to secure the display panel between the front frame and the plastic frame.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
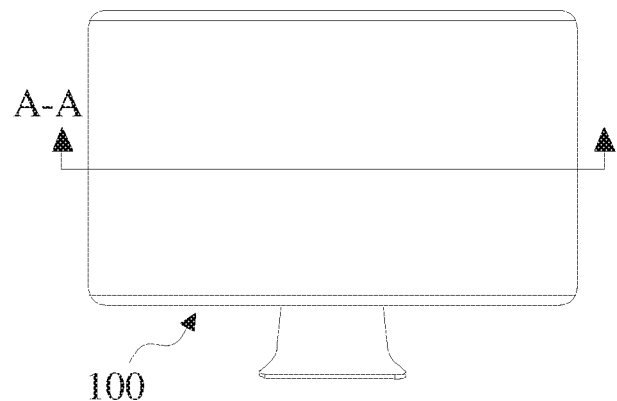
FIG. 1 is a structural schematic view of a display device according to an embodiment of the disclosure.

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

In FIG. 1 to FIG. 8, structures having similar or similar structures are denoted by the same reference numerals.

Referring to FIG. 1, this is a schematic structural view of a display device in the present embodiment. In some embodiments, the display device 100 may be, for example, a liquid crystal display device, an OLED display device, a QLED display device, or other type of display device, without particular limitation herein.

Figure 2:
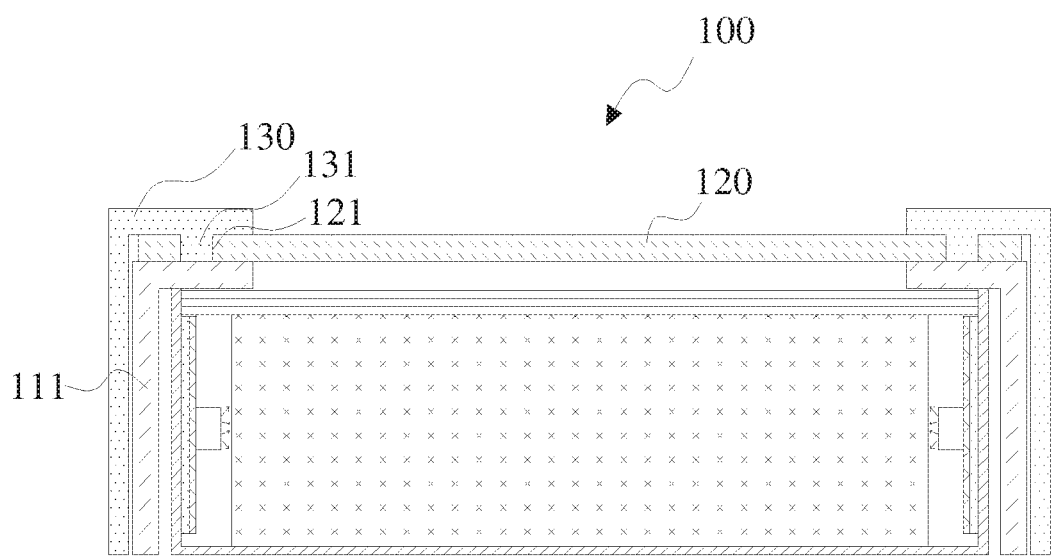
FIG. 2 is a cross-sectional schematic view taken along arrow A-A direction of the display device of FIG. 1, according to an embodiment of the disclosure.
Figure 3:
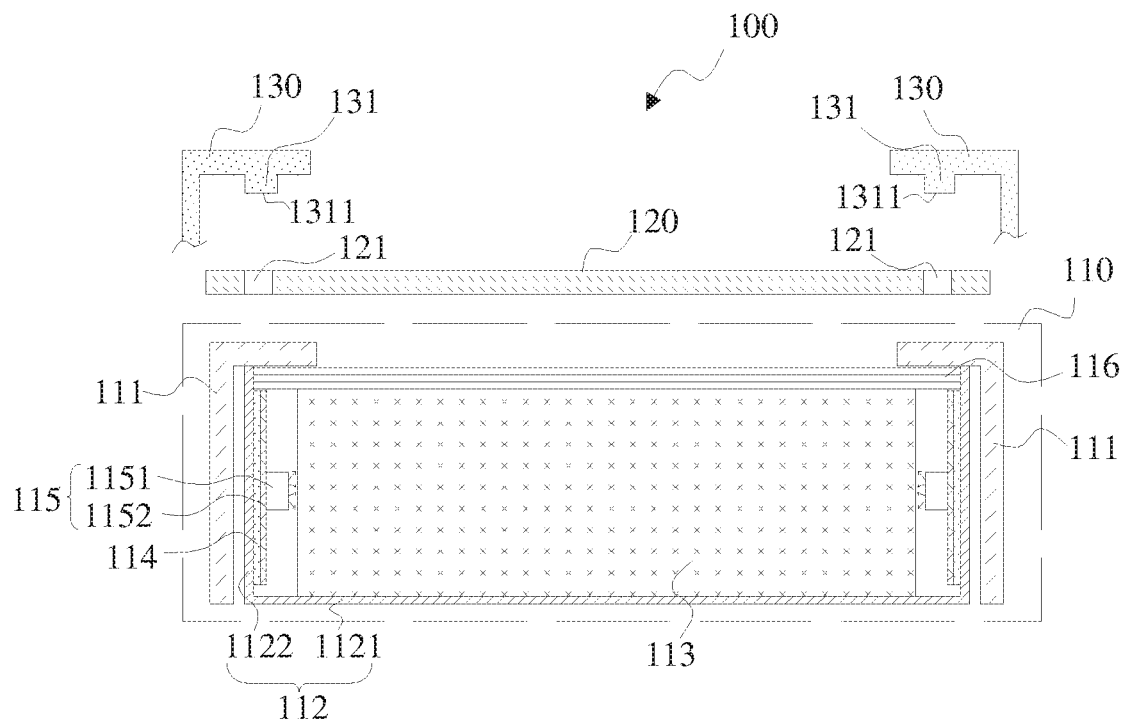
FIG. 3 is an exploded view of the display device shown in FIG. 2.

Referring to FIG. 2 and FIG. 3, FIG. 2 is a schematic cross-sectional view taken along the arrow A-A direction in the display device shown in FIG. 1, and FIG. 3 is an exploded view of the display device shown in FIG. 2. The display device 100 includes a backlight module 110, a display panel 120, and a front frame 130. The respective structures of the display device 100 will be described in detail below with reference to the accompanying drawings.

The backlight module 110 includes a plastic frame 111, a back plate 112, a light guide plate 113, a heat dissipating element 114, a light source assembly 115, and an optical film 116.

The back plate 112 includes a bottom portion 1121 and at least one sidewall 1122. The side wall 1122 extends from the edge of the bottom portion 1121 to the display panel 120. In one embodiment, the sidewall 1122 forms an angle of 90 degree with the bottom portion 1121, in other words, the sidewall 1122 is perpendicular to the bottom portion 1121. It is to be understood that, in other embodiments, the sidewall 1122 is not necessarily strictly perpendicular to the bottom portion 1121 and may be generally vertical to the bottom portion 1211.

In order to integrate the members of the backlight module 110, in the present embodiment, the back plate 112 defines four sidewalls 1122, and the four sidewalls 1122 extend from four edges of the bottom portion 1121 along a direction close to the display panel 120. The four sidewalls 1122 and the bottom portion 1121 define a receiving space, and the light guide plate 113, the heat dissipating element 114, the light source assembly 115, the optical film 116 and the like of the backlight module 110 are accommodated in the receiving space.

It is to be understood that, in other embodiments, the number of sidewalls 1122 of the back plate 112 may be less or more, without particular limitation herein.

The heat dissipating element 114 is provided on the side wall 1122 of the back plate 112. Specifically, the heat dissipating element 114 may be an aluminum extruded heat member, which is adhered to the sidewall 1122 of the back plate 112 by a double-sided thermal tape or the like. The heat dissipating element 114 is used to dissipate heat from the light source assembly 115. It should be noted that the heat dissipating element 114 may be other radiating member, and the specific material of the heat dissipating element 114 is not limited, just being capable of dissipating heat. In addition, the method of attaching the heat dissipating element 114 to the sidewall 1122 is not limited, and other attaching methods also can be used besides adhesive.

The light source assembly 115 is provided on the sidewall 1122 of the back plate 112. Specifically, the light source assembly 115 is attached to the heat dissipating element 114 by adhesive. The light source assembly 115 includes a light source 1151 and a printed circuit board 1152. The light source 1151 is mounted on the printed circuit board 1152. The printed circuit board 1152 is attached to the heat dissipating element 114 via a thermally conductive double-sided tape or the like. The heat generated from the light source 1151 may be dissipated via the heat dissipating element 114.

In the present embodiment, the light source 1151 is an elongated LED light bar, and there are two light source assemblies 115 attached on two opposite sidewalls 1122 of the back plate 112, respectively, as shown in FIG. 2 and FIG. 3. It is noted that the number of the light source assembly 115 is not limited to be two, also can be less or more.

The light guide plate 113 is disposed on the bottom portion 1121 of the back plate 112. The incident side of the light guide plate 113 is opposite to the light source 1151 of the light source assembly 115. So that, light emitted from the light source 1151 can be conducted to the emitting side of the light guide plate 113.

The optical film 116 is disposed at the emitting side of the light guide plate 113, and the edge of the optical film 116 abuts against the side wall 1122 of the back plate 112. The optical film 116 performs dodging processing to the light emitted from the emitting side of the light guide plate 113, so that light emitted from the optical film 116 can uniformly irradiate the display panel 120.

The plastic fame 111 engages the outside of the back plate 112 in a manner of snap-fit connection. The plastic frame 111 is engaged with the back plate 112 to form a receiving chamber for accommodating the light guide plate 113, the heat dissipating element 114, the light source assembly 115, the optical film 116, and the like. So that the backlight module 110 forms an integral structure, and the operation and transportation of the backlight module 110 is facilitated.

The display panel 120 is disposed on the plastic frame 111 and is located on the emitting side of the backlight module 110. Specifically, the edge of the display panel 120 is placed on the plastic frame 111, and the display area of the display panel 120 is located on the emitting side of the backlight module 110.

The display panel 120 defines a limiting hole 121. Specifically, the limiting hole 121 is defined in a region of the display panel 120 corresponding to the plastic frame 111. It is noted that the number of the limiting hole 121 may be one or two or more, and the shape of the cross section of the limiting hole 121 may be circular, square or elliptical, and is not limited thereto.

The front frame 130 is engaged with the display panel 120 to form a display device 100 in combination with the display panel 120 and the backlight module 110. A first limiting element is defined at a position of the front frame 130 corresponding to the limiting hole 121. The first limiting element 131 engages with the limiting hole 121 to fix the display panel 120 between the front frame 130 and the plastic frame 111, and to prevent the display panel 120 from falling off between the front frame 130 and the plastic frame 111, thereby preventing the display panel 120 damaged.

In one embodiment, as shown in FIG. 2 and FIG. 3, the first limiting element 131 is a positioning pillar. The first limiting element 131 may be integrally formed with the front frame 130. As such, the first limiting element 131 protrudes outwardly from an inner surface of the front frame 130. Of course, in other embodiments, the first limiting element 131 may also be detachably mounted on the inner surface of the front frame 130, without particular limitation herein.

When the front frame 130 is engaged with the display panel 120, the first limiting element 131 passes through the limiting hole 121, and a free end 1311 of the first limiting element 131 abuts against the plastic frame 111 to fix the display panel 120 between the front frame 130 and the plastic frame 111. Of course, in other embodiments, the free end 1311 of the first stop 131 may also not against the plastic frame 111, and is not specifically limited herein.

In order to secure the positional relationship among the front frame 130, the display panel 120 and the plastic frame 111, the free end 1311 of the first limiting element 131 is attached to the plastic frame 111 via adhesive, when the free end 1311 abuts against the plastic frame 111. For example, a double-sided adhesive is provided on the end surface of the free end 1311. When the free end 1311 approaches the plastic frame 111, the free end 1311 is adhered to the plastic frame 111. So that the front frame 130 and the plastic frame 111 are attached and formed integrally, and the display panel 120 is stably secured between the front frame 130 and the plastic frame 111.

It is understood that the number of the first limiting element 131 may be one or two or more, and the number of the first limiting element 131 is equal to that of the limiting hole 121. The specific structure of the first limiting element 131 is not limited to the structure shown in FIG. 2 and FIG. 3, also can be other suitable structure.

Figure 4:
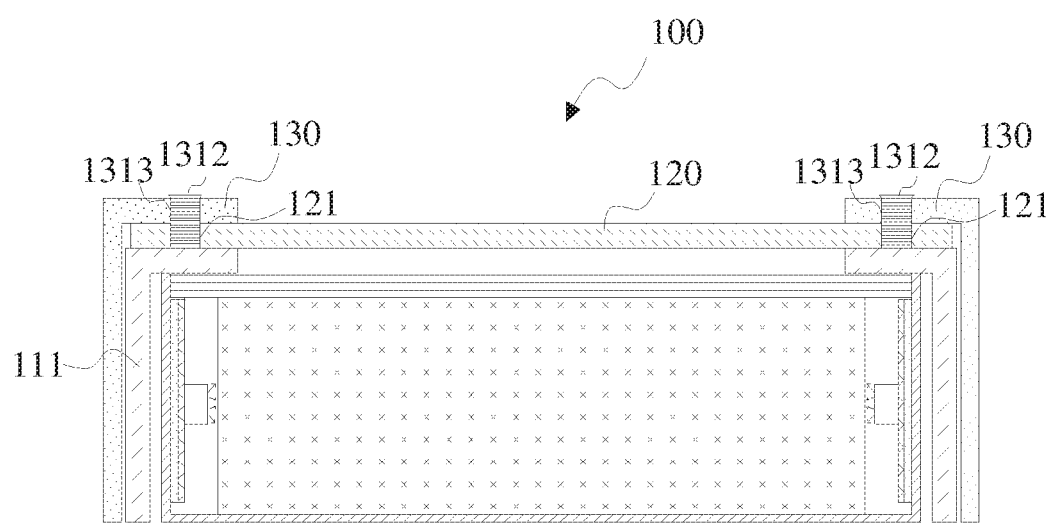
FIG. 4 is a cross-sectional schematic view taken along arrow A-A direction of the display device of FIG. 1, according to another embodiment of the disclosure.
Figure 5:
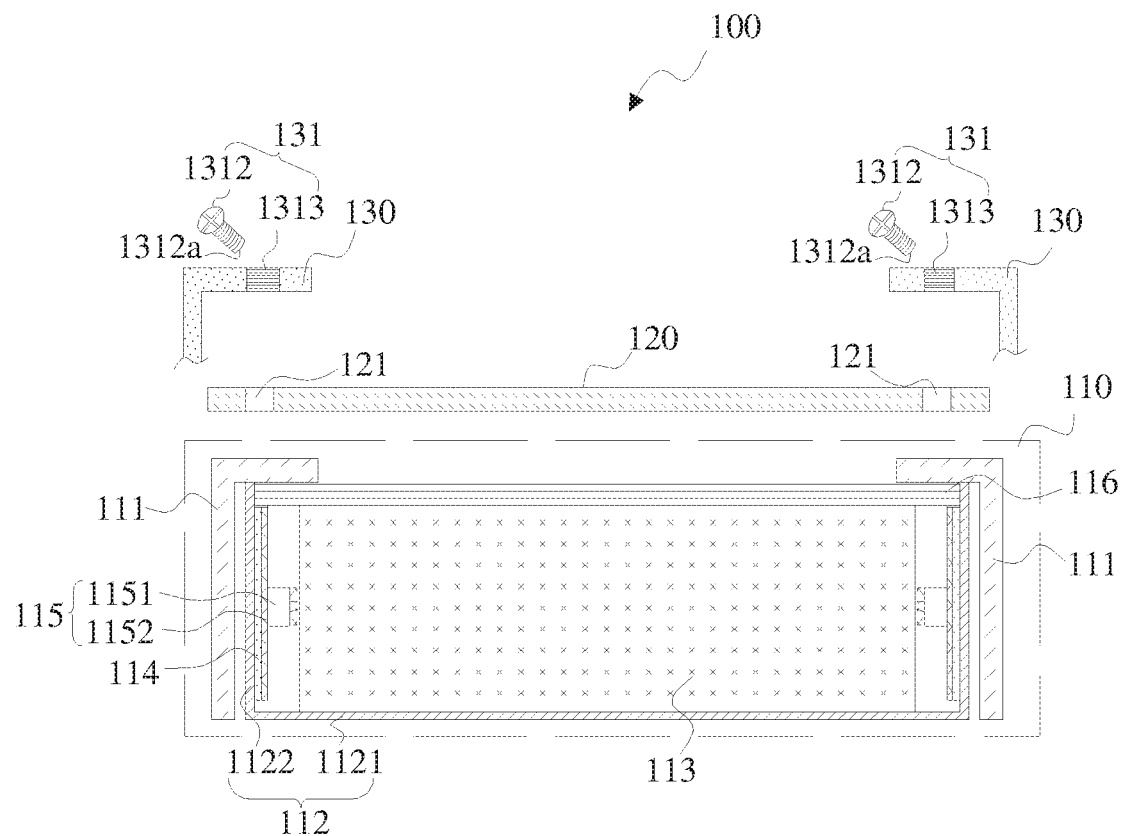
FIG. 5 is an exploded view of the display device shown in FIG. 4.

For example, in one embodiment, referring to FIG. 4 and FIG. 5, FIG. 4 is another schematic cross-sectional view taken along the arrow A-A direction in the display device shown in FIG. 1, and FIG. 5 is an exploded view of the display device shown in FIG. 4. The first limiting element 131 includes a first screw 1312 and a first screw hole 1313. When the front frame 130 is engaged with the display panel 120, the first screw 1312 passes through the first screw hole 1313 and the limiting hole 121, and a free end 1312a of the first screw 1312 abuts against the plastic frame 111 to secure the display panel 120 between the front frame 130 and the plastic frame 111.

In one embodiment, in order to stabilize the positional relationship of the front frame 130, the display panel 120, and the plastic frame 111, the free end 1312a of the first screw 1312 is attached to the plastic frame 111 via adhesive, when the free end 1312a abuts against the plastic frame 111. For example, a double-sided adhesive is provided on the end surface of the free end 1312a. When the free end 1312a approaches the plastic frame 111, the free end 1312a is adhered to the plastic frame 111. So that the front frame 130 and the plastic frame 111 are attached and formed integrally, and the display panel 120 is stably secured between the front frame 130 and the plastic frame 111.

Figure 6:
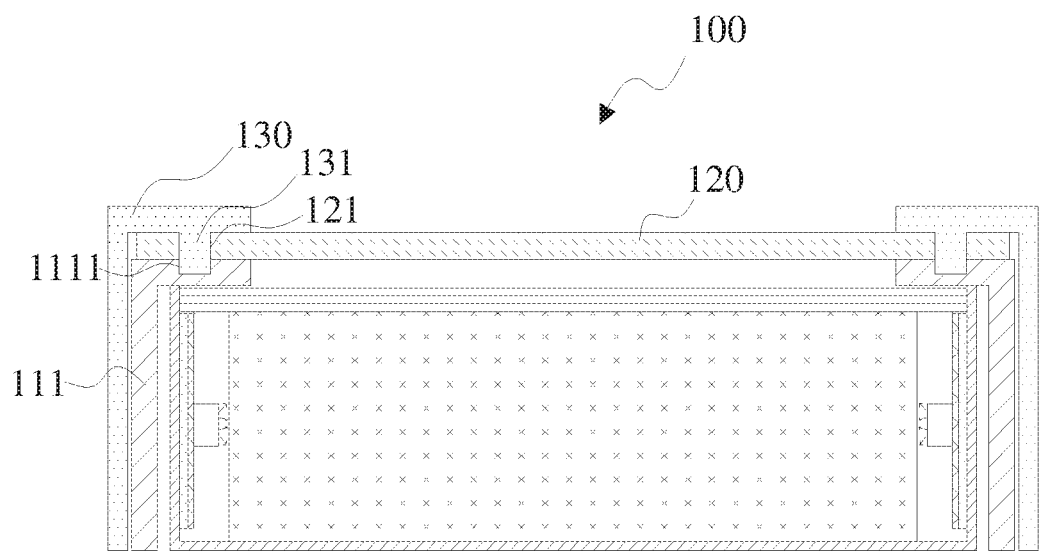
FIG. 6 is a cross-sectional schematic view taken along arrow A-A direction of the display device of FIG. 1, according to another embodiment of the disclosure.

In another embodiment, in order to further stabilize the positional relationship of the display panel 120, the front frame 130, and the plastic frame 111, and to prevent the display panel 120 from falling off between the front frame 130 and the plastic frame 111, please referring to FIG. 6, which is another schematic cross-sectional view taken along the arrow A-A of the display device shown in FIG. 1. In this embodiment, a second limiting element 1111 is defined at a position of the plastic frame 111 corresponding to the limiting hole 121. The first limiting element 131, the limiting hole 121, and the second limiting element 1111 cooperate with each other to secure the display panel 120 between the front frame 130 and the plastic frame 111.

Specifically, as shown in FIG. 6, the second limiting element 1111 is a positioning slot. When the front frame 130 is engaged with the display panel 120, the first limiting element 131 passes through the limiting hole 121 and inserts into the positioning slot, so as to fix the display panel 120 between the front frame 130 and the plastic frame 111.

In other embodiments, the second limiting element 1111 may also be a positioning hole. As such, the first limiting element 131 passes through the limiting hole 121 and the second limiting element 1111 sequentially, and the display panel 120 is secured between the front frame 130 and the plastic frame 111.

Figure 7:
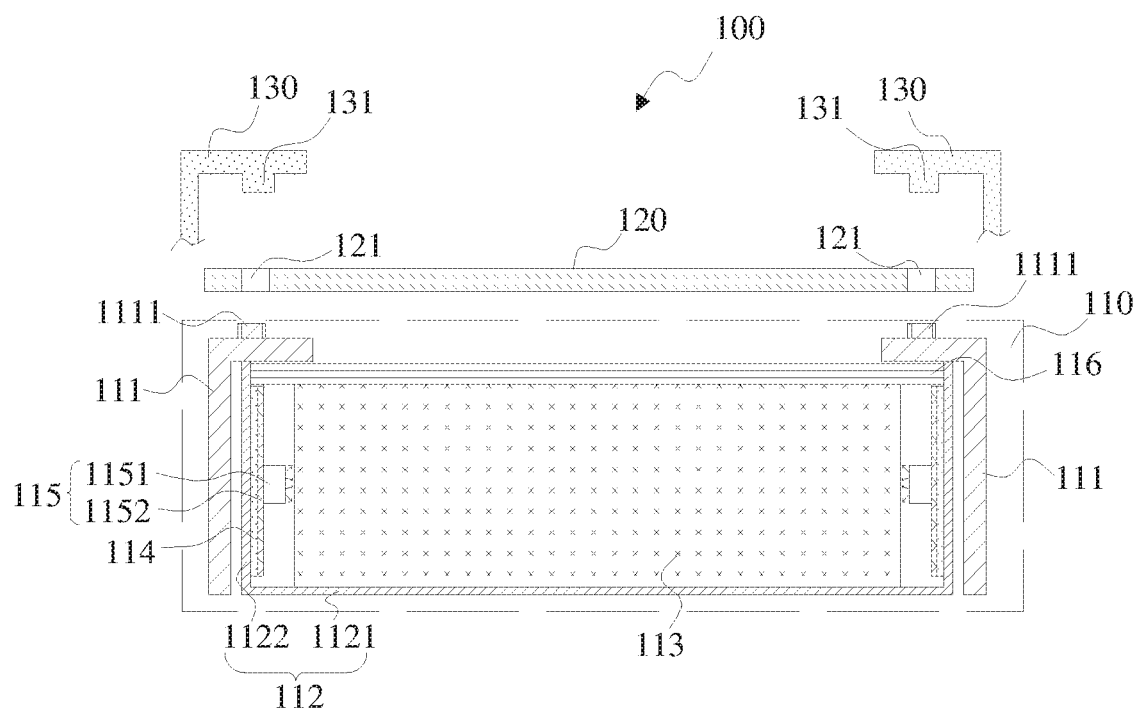
FIG. 7 is a cross-sectional schematic view taken along arrow A-A direction of the display device of FIG. 1, according to another embodiment of the disclosure.
Figure 8:
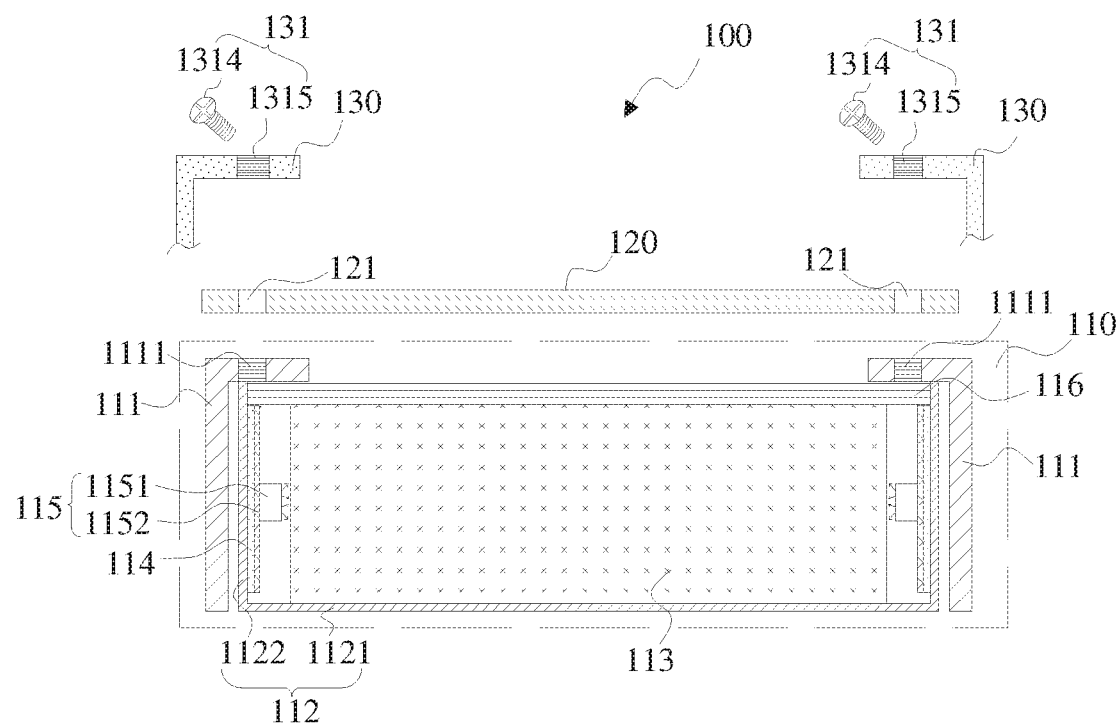
FIG. 8 is a cross-sectional schematic view taken along arrow A-A direction of the display device of FIG. 1, according to another embodiment of the disclosure.

In addition, the specific structure of the second limiting element 1111 is not limited to be positioning slot or positioning hole. It also can be other structure, such as shown in FIG. 7 and FIG. 8. FIG. 7 and FIG. 8 each are schematic cross-sectional views taken along the arrow A-A direction in the display device shown in FIG. 1, according to other embodiments.

In the display device 100 as shown in FIG. 7, the first limiting element 131 is a positioning pillar, and the second limiting element 1111 is a hollow positioning sleeve. The second limiting element 1111 protrudes from the surface of the plastic frame 111. The inner diameter of the second limiting element 1111 may be slightly smaller than the outer diameter of the first limiting element 131. Thus, when the positioning pillar penetrates through the limiting hole 121 and inserts into the hollow positioning sleeve, the positioning pillar engages with the hollow positioning sleeve by an interference fit. As such, the engagement of the first limiting element 131 and the second limiting element 1111 is secured, and further the positional relationship of the display panel 120, the front frame 130, and the plastic frame 111 is stabilized. The display panel 120 is prevented from falling off.

It is understood that, in other embodiments, the first limiting element 131 can be a hollow positioning sleeve, and the second limiting element 1111 can be a positioning pillar. When the front frame 130 is engaged with the display panel 120, the second limiting element 1111 penetrates through the limiting hole 121 and inserts into the first limiting element 131.

In the display device 100 as shown in FIG. 8, the first limiting element 131 includes a second screw 1314 and a second screw hole 1315, and the second limiting element 1111 is a screw hole. When the front frame 130 is engaged with the display panel 120, the second screw 1314 penetrates through the second screw hole 1315, the limiting hole 121, and the second limiting element 1111 in sequence, thereby securing the display panel 120 between the front frame 130 and the plastic frame 111.

It is to be understood that, in the above mentioned embodiments, the specific structure of the first limiting element 131 and the second limiting element 1111 is not limited to the above described kinds of structures. The engagement of the first limiting element 131 and the second limiting element 1111 is also not limited to be described above as shown in FIG. 6 to FIG. 8, as long as the display panel 120 can be secured between the front frame 130 and the plastic frame 111, by the cooperation of the first limiting element 131, the limiting hole 121, and the second limiting element 1111.

In the present disclosure, in the display device 100, the display panel 120 defines a limiting hole 121, the front frame 130 defines a first limiting element 131 corresponding to the limiting hole 121, and the first limiting element 131 engages with the limiting hole 121. As such, the display panel 120 is secured between the front frame 130 and the plastic frame 111 so as to prevent the display panel 120 from falling off. The stability of the display device 100 is enhanced, the deterioration rate of the display panel 120 is reduced, and a narrow frame display device structure can be achieved.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A display device, comprising:
    a backlight module comprising a plastic frame;
    a display panel provided on the plastic frame and positioned at an emitting side of the backlight module, wherein at least one limiting hole is defined in the display panel;
    a front frame engaged with the display panel by a snap-fit connection, wherein at least one first limiting element is defined at the front frame corresponding to the at least one limiting hole; and
    wherein the first limiting element is a positioning pillar;
    wherein the plastic frame defines a second limiting element corresponding to the limiting hole,
    wherein the first limiting element, the second limiting element, and the limiting hole cooperate with each other so as to secure the display panel between the front frame and the plastic frame;
    wherein the second limiting element is a hollow positioning sleeve protruding outwardly from an outer surface of the plastic frame, the positioning pillar penetrates through the limiting hole and inserts into the hollow positioning sleeve.

2. The display device according to claim 1, wherein an inner diameter of the second limiting element is less than an outer diameter of first limiting element, thereby causing an interference fit between the first limiting element and the second limiting element.

3. The display device according to claim 1, wherein a free end of the first limiting element is attached on the plastic frame by adhesive when the first limiting element resists the plastic frame.

4. The display device according to claim 1, wherein the backlight module further comprises a back plate, a light guide plate, a heat dissipating element, a light source assembly, and an optical film, the back plate comprises a bottom portion and a sidewall, the heat dissipating element and the light source assembly are attached on the sidewall, the light guide plate is attached on the bottom portion, and the optical film is positioned at an emitting side of the light guide plate.

5. The display device according to claim 4, wherein the plastic frame is engaged with the back plate, thereby forming a receiving chamber to receive the light guide plate, the heat dissipating element, the light source assembly, and the optical film.

6. A display device, comprising:
    a backlight module comprising a plastic frame;
    a display panel attached on the plastic frame and positioned at an emitting side of the backlight module, a limiting hole being defined in the display panel;
    a front frame engaged with the display panel by a snap-fit connection, a first limiting element being defined at the front frame corresponding to the limiting hole; and
    wherein the plastic frame defines a second limiting element corresponding to the limiting hole, wherein the first limiting element, the second limiting element, and the limiting hole cooperate with each other so as to secure the display panel between the front frame and the plastic frame;
    wherein the first limiting element is one of a positioning pillar and a hollow positioning sleeve, the second limiting element is the other one of the positioning pillar and the hollow positioning sleeve, the positioning pillar penetrates through the limiting hole and inserts into the hollow positioning sleeve.

7. The display device according to claim 6, wherein the backlight module further comprises a back plate, a light guide plate, a heat dissipating element, a light source assembly, and an optical film, the back plate comprises a bottom portion and a sidewall, the heat dissipating element and the light source assembly are attached on the sidewall, the light guide plate is attached on the bottom portion, the optical film is positioned at an emitting side of the light guide plate, the plastic frame is engaged with the back plate, thereby forming a receiving chamber to receive the light guide plate, the heat dissipating element, the light source assembly, and the optical film.

8. A display device, comprising:
a backlight module comprising a plastic frame;
a display panel attached on the plastic frame and positioned at an emitting side of the backlight module, a limiting hole being defined in the display panel;
a front frame engaged with the display panel by a snap-fit connection, a first limiting element being defined at the front frame corresponding to the limiting hole; and
wherein the plastic frame defines a second limiting element corresponding to the limiting hole, the first limiting element, the second limiting element, and the limiting hole cooperate with each other so as to secure the display panel between the front frame and the plastic frame;
wherein the second limiting element is a screw hole, the first limiting element includes a screw and a second screw hole, and the screw penetrates through the second screw hole, the limiting hole, and the second limiting element.

* * * * *